United States Patent [19]

Brunner et al.

[11] Patent Number: 5,970,407
[45] Date of Patent: Oct. 19, 1999

[54] COMPENSATION FOR MOBILE ASSISTED HANDOFF MEASUREMENT INACCURACIES

[75] Inventors: Richard Brunner, Montreal; Daniel Dulong, Pincourt, both of Canada

[73] Assignee: Telefonaktiebolaget L M Ericsson (publ), Stockholm, Sweden

[21] Appl. No.: 08/777,820

[22] Filed: Dec. 31, 1996

[51] Int. Cl.⁶ ...................................................... H04Q 7/20
[52] U.S. Cl. ........................... 455/437; 455/422; 455/436
[58] Field of Search ..................... 455/436, 434, 455/437, 439, 443, 422, 550; 370/331, 332

[56] References Cited

U.S. PATENT DOCUMENTS

| | | | |
|---|---|---|---|
| 4,718,081 | 1/1988 | Brenig | 455/438 |
| 5,257,399 | 10/1993 | Kallin et al. | 455/434 |
| 5,267,261 | 11/1993 | Blakeney et al. | |
| 5,422,933 | 6/1995 | Barnett et al. | 455/439 |
| 5,432,842 | 7/1995 | Kinoshita et al. | 455/440 |
| 5,483,669 | 1/1996 | Barnett et al. | 455/437 |
| 5,499,386 | 3/1996 | Karlsson | 455/437 X |
| 5,499,387 | 3/1996 | Chambert | 455/437 X |
| 5,509,051 | 4/1996 | Barnett et al. | |
| 5,722,073 | 2/1998 | Wallstedt et al. | 455/437 |
| 5,761,623 | 6/1998 | Lupien et al. | 455/552 |
| 5,774,809 | 6/1998 | Tuutijarvi et al. | 455/437 |
| 5,794,147 | 8/1998 | Huang | 455/434 |

FOREIGN PATENT DOCUMENTS

WO 95/35631 12/1995 WIPO.
WO 96/26621 8/1996 WIPO.
WO 9/38997 12/1996 WIPO.

OTHER PUBLICATIONS

PCT Search Report for PCT/SE 97/02077 dated Sep. 18, 1998.

Primary Examiner—William G. Trost
Attorney, Agent, or Firm—Jenkens & Gilchrist PC

[57] ABSTRACT

A mobile assisted handoff (MAHO) signal strength measurement is ordered by the cellular telephone system for not only the currently used traffic channel and the reference (control) channels of neighboring cells, but also for the reference (control) channel of the current cell. These MAHO measurements are reported to the system where a compensation factor is determined which accounts for the use of different modulation schemes and or hyperbands by system traffic and control channels. The compensation factor is calculated by subtracting the MAHO measurement made on the reference channel of the current cell from the MAHO measurement made on the traffic channel of the current cell. The calculated compensation factor is then added to each of the MAHO measurements made on the reference channels for each of the neighboring cells to generate compensated signal strength measurements. The compensated measurements are then compared to the MAHO measurement made on the traffic channel (in view of a predetermined hysteresis) to determine whether a handoff to one of the neighboring cells should be made.

26 Claims, 2 Drawing Sheets

COMPENSATION FOR MOBILE ASSISTED HANDOFF MEASUREMENT INACCURACIES

BACKGROUND OF THE INVENTION

1. Technical Field of the Invention

The present invention relates to cellular telephone networks and,, in particular, to the process for effectuating mobile assisted handoff (MAHO) within a cellular telephone network.

2. Description of Related Art

Reference is now made to FIG. 1 wherein there is shown a schematic view of a cellular telephone system 10 including a plurality of individual cells 12. Each cell 12 operates with a different assigned set of channels. In non-multiplexed communications systems, any given frequency comprises a channel. In multiplexed communications systems, however, each frequency is divided into a plurality of time slots which comprise the channels. The set of channels assigned to each cell 12 includes at least one control channel (CCH) including a reference, pilot and/or measurement channel operable in either or both an analog and/or a digital mode, and a plurality of traffic (or voice) channels (TCHs) also operable in either or both an analog and/or a digital mode. Sets of assigned channels are different for adjacent cells 12, and such sets are not repeated except for cells that are far enough away from each other to minimize the likelihood of adjacent channel or co-channel interference.

A base station 14 including a plurality of transceivers (not shown) capable of independently operating on each of the assigned set of channels is provided for each of the cells (one set of channels per base station). Via the transceivers, the base stations 14 engage in communications with plural mobile stations 16 operating within the area of the associated cell 12. The control channels in the set of channels assigned to each cell 12 are used to carry system control signals between the base station 14 and proximately located mobile stations 16. Such control signals include page signals, page response signals, location registration signals, voice channel assignments, maintenance instructions, and cell selection or reselection instructions. The plurality of traffic channels in the set of channels assigned to each cell 12 are used to carry subscriber voice or data communications as well as system handoff communications between the base station 14 and proximately located mobile stations 16.

The base stations 14 further communicate via signaling links and voice trunks 22 with a central control station, commonly referred to as a mobile switching center 18, which functions to control operation of a portion of the system 10. In particular, the mobile switching center 18 operates to selectively connect subscriber voice and data communications to the mobile stations 16 through the base stations 14. Thus, the mobile switching center 18 controls system operation through and in response to the transmission of control signals over the control channels to set-up on the traffic channels calls that are either originated by or terminated at the mobile stations 16. The mobile switching center 18 further controls, through and in response to control and traffic channel transmissions, as well as measurements made on control and traffic channels, the handoff of a subscriber communication from a traffic channel of one cell 12 to a traffic channel of another cell as the subscriber mobile station 16 moves throughout the cellular service area during an ongoing communication.

A brief description of the handoff process is now provided. An ongoing call communication is being carried by one selected traffic channel. As the mobile station 16 moves around the broadcast coverage area of a currently serving cell 12, the mobile station makes signal strength measurements on both the currently used traffic channel and a reference one of the included control channels (also referred to as a pilot channel or measurement channel) for each of the neighboring cells identified on a neighbor list supplied to the mobile station by the mobile switching center. At the same time, the base station 14 for the serving cell 12 may make uplink signal strength measurements on the currently used traffic channel. When the mobile station 16 moves towards the edge of the currently serving cell 12, system evaluation of the downlink and uplink measured signal strengths for the currently used traffic channel and downlink measured signal strengths for the control (reference) channels of the neighboring cells provides an indication that a handoff is necessary. At that point, the system identifies potential candidate cells 12 for handoff and requests that the base stations 14 for these cells make and report on measured uplink signal strength with respect to the current traffic channel. By processing all of the made uplink and downlink signal strength measurements, the system chooses a new cell 12 (and associated base station 14) to handle continuation of the call. A traffic channel from the set of channels assigned to the chosen new cell 12 is then selected, and a command is transmitted from the mobile switching center 18 over the current traffic channel ordering the mobile station 16 to switch communications to the selected traffic channel in the new cell. At the same time, the mobile switching center 18 re-routes the call from the base station 14 in the old cell 12 to the base station 14 for the new cell to complete the handoff process.

In some cellular telephone systems, the traffic channels and the control channels utilize different types of signal modulation schemes. For example, in a digital cellular telephone system such as that proposed by the digital advanced mobile phone service (D-AMPS), the traffic channels utilize quadrature phase shift keying (QPSK), and at least the measurement (reference or pilot) ones of the control channels utilize frequency shift keying (FSK) as their respective modulation schemes. It has been noted, however, that in some cases significant discrepancies in MAHO made downlink measured signal strength may exist between the traffic channel of the serving cell and the control channel of a neighboring cell. These discrepancies have been linked, at least in part, to the differences in modulation types used on the signals. Additionally, with specific reference to cellular systems supporting plural hyperband communications (for example, operation at both 800 MHz and 1900 MHz), it has been noted that significant discrepancies in MAHO made downlink measured signal strength may exist between the traffic channel of the serving cell operating in one hyperband and the control channel of a neighboring cell operating in another hyperband.

Reference is now made to FIG. 2 wherein there is shown a graph illustrating a comparison of downlink signal strength measurements made by a mobile station on a reference (control) channel versus a traffic channel. The graph of FIG. 2 is generated from an experiment recording downlink signal strength measurements on the reference (control) channel of the serving cell and the traffic channel of the currently serving cell for all mobile station handoff requests made over a twenty-four hour period. In the experiment, the reference (control) channel utilized frequency shift keyed (FSK) modulation, and the traffic channel utilized quadrature phase shift keyed (QPSK) modulation, and both channels were in the same hyperband. The recorded measurements for each handoff were compared (i.e., control channel signal strength for the serving cell minus traffic channel signal strength for the serving cell), with the comparison results across the twenty-four hour test period used to generate a probability density function (pdf). The peak of the probability density function illustrates a large number of handoff instances wherein the mobile station downlink traffic channel signal strength measurements with respect to the serving cell are between four and five decibels (4–5 dB) less than the mobile station downlink reference (control) channel signal strength measurements with respect to the target cell. Similar results have been noted when the reference (control) channel of the serving cell and the traffic channel of the currently serving cell utilize different hyperbands.

It has further been noted that such modulation and/or hyperband discrepancies in MAHO made downlink measured signal strength may adversely impact cellular telephone system performance. For example, the discrepancies, when not accounted for during system handoff processing, may causing oscillating (i.e., ping-pong) handoffs as the mobile station moves along the boundary between two adjacent cells. There is a need then for a mechanism that would allow the cellular telephone system to account for modulation scheme and hyperband influenced discrepancies in MAHO made downlink signal strength measurements.

Reference is now made to FIG. 3 wherein there is shown a graph illustrating a comparison of downlink signal strength measurements made by a mobile station on one traffic channel versus another traffic channel. The graph of FIG. 3 is generated from an experiment recording downlink signal strength measurements on a first traffic channel of the serving cell and a second traffic channel of the currently serving cell in relation to mobile station handoff requests made over a twenty-four hour period. In the experiment, each of the first and second traffic channels utilized quadrature phase shift keyed (QPSK) modulation, and each were within the same hyperband. The recorded measurements for each handoff were compared (i.e., first traffic channel signal strength for the serving cell minus second traffic channel signal strength for the serving cell), with the comparison results across the twenty-four hour test period used to generate a probability density function (pdf). The peak of the probability density function illustrates a large number of handoff instances wherein the mobile station downlink first traffic channel signal strength measurements with respect to the serving cell and second traffic channel signal strength measurements with respect to the serving cell are nearly the same. This shows that downlink signal strength measurements for traffic channels using the same QPSK modulation scheme are comparable. Similar results occur with respect to evaluating FSK modulation when comparing downlink signal strength measurements on a first control channel of the serving cell and a second control channel of the currently serving cell.

SUMMARY OF THE INVENTION

To address the foregoing problem, a mobile assisted handoff (MAHO) signal strength measurement is ordered by a cellular telephone system not only for the currently used traffic channel and the reference (control) channels of neighboring cells, but also for the reference (control) channel of the current cell. A compensation factor is then determined by the system to account for the use of different modulation schemes and/or hyperbands by system traffic and control channels. The compensation factor is calculated by subtracting the MAHO measurement made on the reference channel of the current cell from the MAHO measurement made on the traffic channel of the current cell. The calculated compensation factor is then added to each of the MAHO measurements made on the reference channels for each of the neighboring cells to generate compensated signal strength measurements. The compensated measurements are then used in place of the conventional MAHO made control channel measurements to make the handoff determination.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
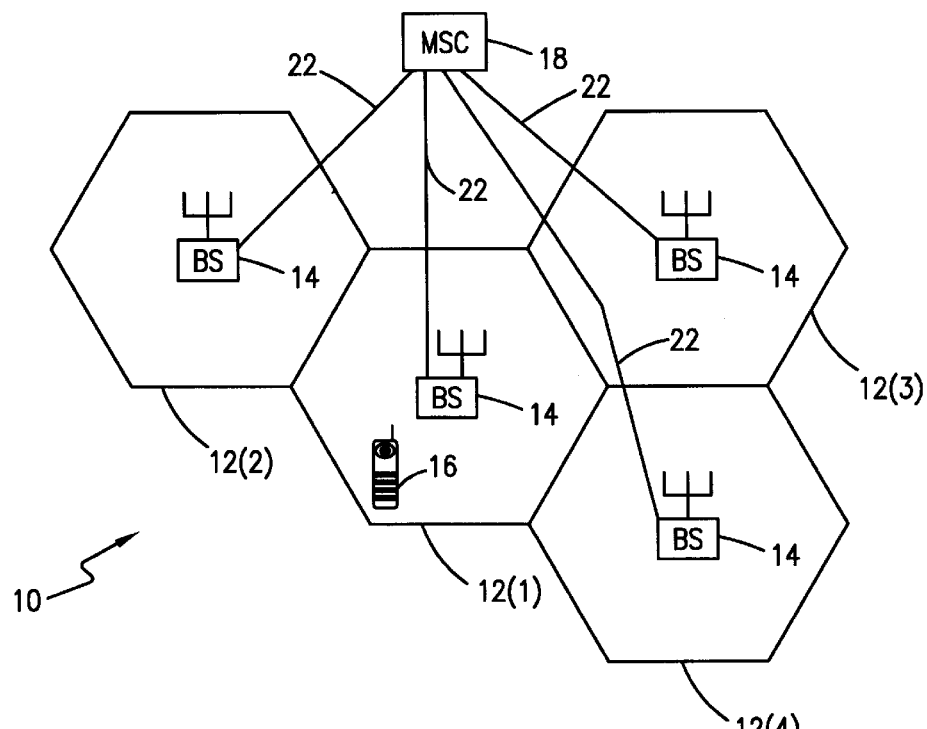
FIG. 1 (previously described) is a schematic diagram of a cellular telephone system.
Figure 2:
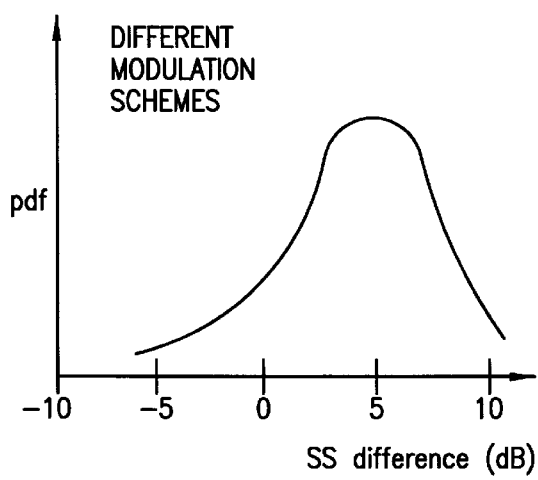
FIG. 2 (previously described) is a density graph illustrating a comparison of downlink signal strength measurements made by a mobile station on a reference (control) channel of a target cell versus a traffic channel of a currently serving cell.
Figure 3:
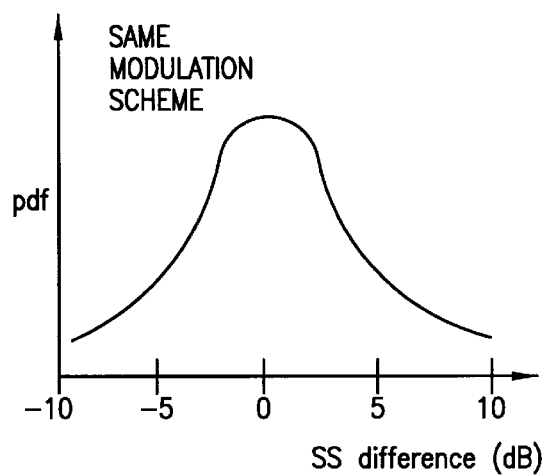
FIG. 3 (previously described) is a density graph illustrating a comparison of downlink signal strength measurements made by a mobile station on a traffic channel of a target cell versus a traffic channel of a currently serving cell.
Figure 4:
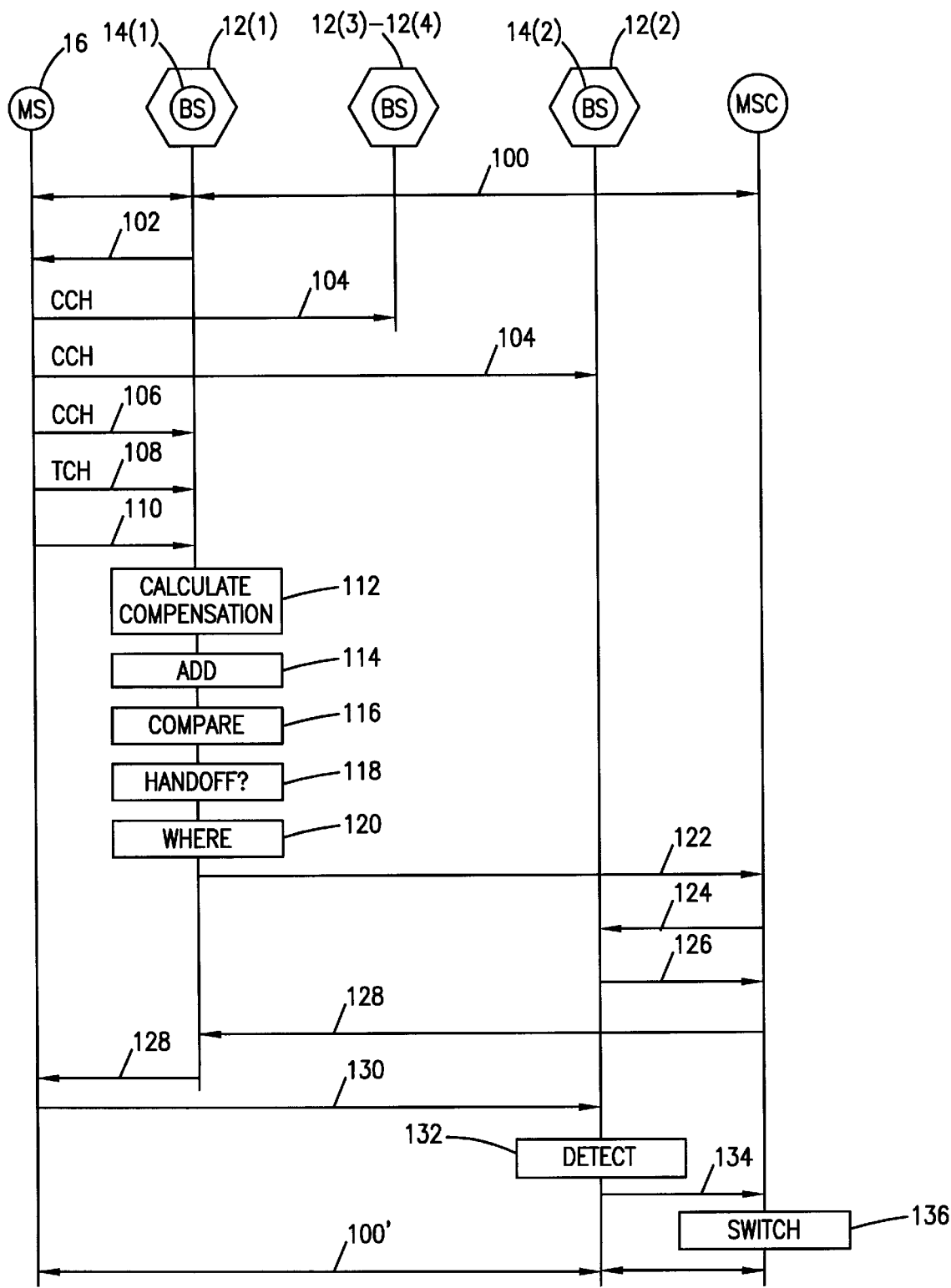
FIG. 4 is a signal flow and network operation diagram illustrating the handoff process in accordance with the present invention.

Reference is now made to FIG. 4 wherein there is shown a flow diagram illustrating the handoff of a mobile station 16 from a first (serving) cell 12(1) to a second (target) cell 12(2) in accordance with the present invention. An ongoing call communication 100 is being carried by one selected traffic channel of the first cell 12(1). A message 102 is sent to the mobile station 16 including a list of neighboring cells 12 and the channels assigned thereto that the mobile station is to scan for in order to make downlink signal strength measurements. In accordance with the known mobile assisted handoff procedure, this neighbor list identifies the reference (control) channels for certain ones of the cells 12(2)–12(4) neighboring the currently serving cell 12(1). In accordance with the present invention, this neighbor list message 102 further includes, as an identified one of the channels to scan for and make signal strength measurements on, the reference (control) channel of the currently serving cell 12(1). In the event the full, the ref is full, the reference (control) channel of the currently serving cell 12(1) is specified as a temporary substitution. Responsive to the neighbor list, the mobile station 16 makes signal strength measurements 104 on the reference (control) channels for certain ones of the neighboring cells 12(2)–12(4), and also makes a signal strength measurement 106 on the reference (control) channel of the currently serving cell 12(1). The mobile station 16 still further makes a downlink signal strength measurement 108 on the currently used traffic channel of the serving cell 12(1) carrying the call communication 100. All of the foregoing mobile assisted handoff (MAHO) measurements are then reported 110 to the cellular system through the base station 14 for the currently serving cell 12(1).

The base station 14 then calculates (action 112) a modulation scheme compensation factor (C) from the MAHO measurements. The measurements used comprise: the received mobile station made downlink signal strength measurement ($SS_{TCH}$) on the currently used traffic channel of the serving cell 12(1) carrying the call communication 100; and, the downlink signal strength measurement ($SS_{CCH}$) on the reference (control) channel of the currently serving cell 12(1). In particular the compensation factor measures the difference between these two measurements as follows:

$$C = SS_{TCH} - SS_{CCH}, \text{ for the serving cell}$$

Certain assumptions regarding system operation are made with respect to the calculation of the compensation factor. It is assumed that the same modulation scheme (for example, FSK) is used by the reference (control) channels for certain ones of the neighboring cells 12(2)–12(4) and the reference (control) channel of the currently serving cell 12 (1). It is further assumed that the effective radiated power for the cell transceivers is substantially the same. The compensation factor accordingly provides information regarding modulation scheme and/or hyperband influenced discrepancies in MAHO made downlink signal strength measurements. The base station 14(1) then adds (action 114) the compensation value (C) to each of the mobile station 16 reported downlink signal strength measurements 104 made on the reference (control) channels for certain ones of the neighboring cells 12(2)–12(4) to generate compensated downlink reference channel signal strength measurements.

The compensated downlink reference channel signal strength measurements with respect to certain ones of the neighboring cells 12(2)–12(4) are then compared (action 116) to the mobile station 16 reported downlink signal strength measurement 108 made on the currently used traffic channel of the serving cell 12(1) carrying the call communication 100. The comparison generally comprises the subtraction of the downlink traffic channel signal strength measurement 108 (plus some hysteresis value) from each of the compensated downlink reference channel signal strength measurements. From this comparison, the base station 14 determines first whether a hand-off is necessary (action 118) based on the results of the subtraction. Second, the base station 14 determines which cell or cells the hand-off could and/or should preferably occur (action 120) based on the relative magnitudes of the subtraction process results.

In this example, it is assumed that the base station 14 determines 118 that a hand-off is necessary because the traffic channel measurement plus hysteresis does not exceed the compensated control channel measurement. It is further assumed that an identification 120 is made of cell 12(2) as the preferred target cell for hand-off because it has the greatest difference in the measurements. A request 122 for hand-off including information comprising an identification of the currently serving cell 12(1), the traffic channel being used for communication with the mobile station 16 in cell 12(1), the time slot (for a digital traffic channel) carrying the cellular communication, and the target cell 12(2) for hand-off, is then sent by the base station 14(1) to the serving mobile switching center 18. The mobile switching center 18 then signals 124 the target cell 12(2) requesting assignment (and reservation) of a traffic channel (and time slot therein for a digital traffic channel) for hand-off, and is informed 126 of the assignment of the traffic channel in the target cell 12(2). A signal 128 is then sent to the mobile station 16(1) via the base station 14(1) for the currently serving cell 12(1) including a handover command directing the mobile station to switch to the assigned traffic channel (and time slot therein if appropriate) in the target cell 12(2). The mobile station 16(1) then tunes to and accesses 130 the assigned traffic channel (in the proper time slot). When the base station 14(2) detects the mobile station access (action 132), the mobile switching center 18 is informed 134, and the call 100' is switched 136 through the base station 14(2) to complete the hand-off procedure.

The foregoing description is only an example of the procedure used in making the determination to institute a hand-off. It will, of course, be understood that the determination may instead be made by other system nodes, such as in a base station controller connected to the base station 14, or in the mobile switching center 18 itself, rather than in the base station as disclosed. In such cases, the MAHO measurements are forwarded on by the base station 14 for other node calculation of the compensation factor, determination of the compensated control channel signal strength measurements, and determination of whether to handoff and to whom the handoff should occur. The disclosure of base station processing is merely an illustration of system operation.

Implementation of the foregoing process for making and evaluating MAHO measurements presents a number of benefits over other solutions to the signal strength measurement discrepancy problem. First, MAHO measurement accuracy is improved regardless of variations in individual mobile station measurement accuracy. The compensation factor is determined on a handoff-by-handoff and individual mobile station basis. Second, there is no impact on mobile station hardware or software by implementing this solution. Thus, returning and reprogramming mobile stations is not required. Third, improved handoff performance results from using the compensation factor to account for modulation scheme and/or hyperband influenced discrepancies in MAHO made downlink signal strength measurements.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for mobile station assistance with handoff related signal strength measurement comprising the steps of:
   making downlink received signal strength measurements on a reference channel for each of a plurality of neighboring cells;
   making downlink received signal strength measurements on a traffic channel handling an ongoing call communication for the mobile station within a currently serving cell;
   making downlink received signal strength measurements on a reference channel for the currently serving cell;
   reporting the made downlink signal strength measurements; and
   adjusting the reported signal strength measurements made on the reference channels for each of the neighboring cells by a compensation factor determined from the reported signal strength measurement made on the reference channel for the currently serving cell.

2. The method of claim 1 wherein the reference channel comprises a measurement channel.

3. The method of claim 1 wherein the reference channel comprises a pilot channel.

4. The method of claim 1 wherein the reference channel comprises a control channel.

5. The method of claim 1 wherein the reference channels for the currently serving and neighboring cells utilize a first modulation scheme, and the traffic channel for the currently serving cell utilizes a second, different, modulation scheme.

6. The method of claim 5 wherein the first modulation scheme comprises frequency shift keying (FSK) and the second modulation scheme comprises quadrature phase shift keying (QPSK).

7. The method of claim 1 wherein the channels for the currently serving cell utilize a first hyperband, and the channels for at least one of the neighboring cells utilize a second, different, hyperband.

8. The method of claim 7 wherein either the first or second hyperband is at about 1900 MHz, and the other of the first or second hyperbands is at about 800 MHz.

9. A cellular system, comprising:
   first network means for transmitting a neighbor list to a mobile station identifying a plurality of channels for the mobile station to make downlink signal strength measurements on, the neighbor list including:
      an identification of a plurality of reference channels, the reference channels comprising the reference channels for each of a plurality of neighboring cells; and
      an identification of a reference channel for a currently serving cell;
   mobile station means for receiving the transmitted neighbor list, making downlink signal strength measurements on the channels identified therein, and reporting the measured signal strengths; and
   second network means for adjusting the reported signal strength measurements made on the reference channels for each of the neighboring cells by a compensation factor determined from the reported signal strength measurement made on the reference channel for the currently serving cell.

10. The system of claim 9 wherein the reference channel comprises a measurement channel.

11. The system of claim 9 wherein the reference channel comprises a pilot channel.

12. The system of claim 9 wherein the reference channel comprises a control channel.

13. The system as in claim 9 wherein the list further includes:
   an identification of a traffic channel handling an ongoing call communication for the mobile station within the currently serving cell; and
   wherein the compensation factor is determined by the second network means by subtracting the reported signal strength measurement made on the reference channel for the currently serving cell from the reported signal strength measurement made on the traffic channel handling the ongoing call communication within the currently serving cell.

14. The system of claim 13 wherein the reference channels for the currently serving and neighboring cells utilize a first modulation scheme, and the traffic channel for the currently serving cell utilizes a second, different, modulation scheme.

15. The system of claim 14 wherein the first modulation scheme comprises frequency shift keying (FSK) and the second modulation scheme comprises quadrature phase shift keying (QPSK).

16. The system of claim 9 wherein the channels for the currently serving cell utilize a first hyperband, and the channels for at least one of the neighboring cells utilize a second, different, hyperband.

17. The system of claim 16 wherein either the first or second hyperband is at about 1900 MHZ, and the other of the first or second hyperbands is at about 800 MHZ.

18. A method for evaluating mobile station made handoff related signal strength measurements comprising the steps of:
   receiving downlink received signal strength measurements made by the mobile station on:
      a reference channel for each of a plurality of neighboring cells;
      a traffic channel handling an ongoing call communication for the mobile station within a currently serving cell; and
      a reference channel for the currently serving cell;
   calculating a compensation factor by subtracting the mobile station made downlink signal strength measurement on the reference channel for the currently serving cell from the mobile station made downlink signal strength measurement on the traffic channel handling the ongoing call communication within the currently serving cell; and
   adding the compensation factor to each of the mobile station made downlink signal strength measurements on the reference channels for the neighboring cells in order to generate compensated downlink signal strength measurements.

19. The method as in claim 18 further including the step of comparing the compensated downlink signal strength measurements to the mobile station made downlink signal strength measurement on the traffic channel handling the ongoing call communication within the currently serving cell in order to identify a need for mobile station handoff to one of the neighboring cells.

20. The method of claim 18 wherein the reference channel comprises a measurement channel.

21. The method of claim 18 wherein the reference channel comprises a pilot channel.

22. The method of claim 18 wherein the reference channel comprises a control channel.

23. The method of claim 18 wherein the reference channels for the currently serving and neighboring cells utilize a first modulation scheme, and the traffic channel for the currently serving cell utilizes a second, different, modulation scheme.

24. The method of claim 23 wherein the first modulation scheme comprises frequency shift keying (FSK) and the second modulation scheme comprises quadrature phase shift keying (QPSK).

25. The method of claim 18 wherein the channels for the currently serving cell utilize a first hyperband, and the channels for at least one of the neighboring cells utilize a second, different, hyperband.

26. The method of claim 25 wherein either the first or second hyperband is at about 1900 MHz, and the other of the first or second hyperbands is at about 800 MHz.

* * * * *

UNITED STATES PATENT AND TRADEMARK OFFICE
CERTIFICATE OF CORRECTION

PATENT NO. : 5,970,407
DATED : Oct. 19, 1999
INVENTOR(S) : Brunner et al.

It is certified that error appears in the above-identified patent and that said Letters Patent is hereby corrected as shown below:

Column 4, line 48  Replace "full, the ref"
With --neighbor list--

Signed and Sealed this

Third Day of April, 2001

Attest:

NICHOLAS P. GODICI

*Attesting Officer*  *Acting Director of the United States Patent and Trademark Office*